(12) United States Patent
Kingman et al.

(10) Patent No.: US 12,247,711 B1
(45) Date of Patent: *Mar. 11, 2025

(54) LIGHT-CONTROL PANEL WITH GRADUAL INDEX TRANSITION

(71) Applicant: APPLE INC., Cupertino, CA (US)

(72) Inventors: David E. Kingman, San Francisco, CA (US); Clarisse Mazuir, San Jose, CA (US); Peter F. Masschelein, Campbell, CA (US)

(73) Assignee: APPLE INC., Cupertino, CA (US)

( * ) Notice: Subject to any disclaimer, the term of this patent is extended or adjusted under 35 U.S.C. 154(b) by 468 days.

This patent is subject to a terminal disclaimer.

(21) Appl. No.: 17/733,392

(22) Filed: Apr. 29, 2022

Related U.S. Application Data (63) Continuation of application No. 16/894,972, filed on Jun. 8, 2020, now Pat. No. 11,339,931.

(Continued)

(51) Int. Cl.
| | |
|---|---|
| *F21K 9/69* | (2016.01) |
| *B32B 17/10* | (2006.01) |
| *B32B 27/08* | (2006.01) |
| *F21V 5/00* | (2018.01) |
| *G02B 1/11* | (2015.01) |
| *G02F 1/1335* | (2006.01) |

(Continued)

(52) U.S. Cl.
CPC ......... *F21K 9/69* (2016.08); *B32B 17/10541* (2013.01); *B32B 27/08* (2013.01); *F21V 5/008* (2013.01); *G02B 1/11* (2013.01); *G02F 1/133502* (2013.01); *G02F 1/13756* (2021.01); *F21V 2200/20* (2015.01); *F21Y 2115/10* (2016.08); *G02F 2201/38* (2013.01)

(58) Field of Classification Search
None
See application file for complete search history.

(56) References Cited

U.S. PATENT DOCUMENTS

| | | | |
|---|---|---|---|
| 5,341,231 A | 8/1994 | Yamamoto et al. | |
| 10,252,494 B2 | 4/2019 | Berard et al. | |

(Continued)

FOREIGN PATENT DOCUMENTS

| | | |
|---|---|---|
| CN | 103670222 A | 3/2014 |
| WO | 2008125926 A1 | 10/2008 |
| WO | 2018159520 A1 | 9/2018 |

*Primary Examiner* — Ramsey Zacharia
(74) *Attorney, Agent, or Firm* — Young Basile Hanlon & MacFarlane, P.C.

(57) ABSTRACT

Light-control panels including layered optical components are described in this application. An example of a light-control panel includes first and second glazing layers, first and second transitional layers extending between the first and second glazing layers that guide light emitted from a light source, and a third glazing layer extending between the first and second transitional layers through which light emitted from the light source is guided. The light-control panel also includes a light extraction layer extending between the third glazing layer and one of the first and second transitional layers that distributes light emitted from the light source. The first and second transitional layers have refractive indices that gradually decrease from a first value at surfaces proximate to the first and second glazing layers to a second value at surfaces proximate to the third glazing layer in the stack-up of the light-control panel.

20 Claims, 5 Drawing Sheets

Related U.S. Application Data (60) Provisional application No. 62/874,700, filed on Jul. 16, 2019.

(51) Int. Cl.
*G02F 1/137* (2006.01)
*F21Y 115/10* (2016.01)

(56) References Cited

U.S. PATENT DOCUMENTS

| | | | |
|---|---|---|---|
| 11,339,931 B1* | 5/2022 | Kingman | E06B 3/6722 |
| 2005/0276980 A1 | 12/2005 | Decker et al. | |
| 2012/0200931 A1* | 8/2012 | Haag | G02B 5/0242 |
| | | | 521/122 |
| 2015/0167921 A1* | 6/2015 | Gollier | G02B 5/0226 |
| | | | 362/326 |
| 2017/0291392 A1 | 10/2017 | Kawai | |
| 2018/0076399 A1 | 3/2018 | Kim | |

* cited by examiner

LIGHT-CONTROL PANEL WITH GRADUAL INDEX TRANSITION

CROSS-REFERENCE TO RELATED APPLICATION(S)

This application is a continuation of U.S. application Ser. No. 16/894,972, filed on Jun. 8, 2020, which claims the benefit of U.S. Provisional Application No. 62/874,700, filed on Jul. 19, 2019. The contents of the foregoing applications are incorporated herein by reference in their entirety for all purposes.

TECHNICAL FIELD

This disclosure relates generally to light-control panels and in particular to light-transmissive panels formed from laminated glass or glazings with layered optical components including refractive-index transition films to reduce reflections.

BACKGROUND

Panels or glazings, such as those made of glass, polycarbonate, plastic, composite, or other light-transmissive material, have optical properties that determine functionality of the panel, such as panel transmittance. Optical components, such as particle-infused substrates and low-reflection coatings can be used in laminated glass, glazings, or panels formed from light-transmissive materials to selectively modify various optical properties of the panel. For example, optical properties can be modified to selectively guide light and provide a source of illumination from surfaces of the panel or glazing.

Some optical components are susceptible to performance degradation when a surface of the optical component is exposed to an external environment. For example, scratches, fogging, fingerprints, debris, or other types of environmental interference with a surface of the optical component can change a refractive index at the location of the interference. This change in refractive index (a measure of bending of light when passing from one medium into another), can change an optical property and optical performance of the optical component at the location of the refractive index change. Protection for interference-sensitive optical components that does not impact refractive index, optical properties, or optical performance is thus desired.

SUMMARY

One aspect of the disclosed embodiments is a panel that includes first and second glazing layers and a switchable component extending between the first and second glazing layers. The switchable component includes a light source and first and second transitional layers that guide light emitted from the light source. The first and second transitional layers have gradually changing refractive indices. The switchable component also includes a third glazing layer extending between the first and second transitional layers through which light emitted from the light source is guided and a light extraction layer extending between the third glazing layer and one of the first and second transitional layers that distributes light emitted from the light source. The panel also includes first and second lamination layers extending between the switchable component and the first and second glazing layers.

Another aspect of the disclosed embodiments is a switchable component including a light source and a pair of transitional layers that guide light emitted from the light source. The pair of transitional layers have refractive indices that gradually decrease from a first value to a second value. The switchable component also includes a glazing layer extending between the pair of transitional layers through which light emitted from the light source is guided. The surfaces of the pair of transitional layers that extend along surfaces of the glazing layer have the second value of the refractive index. The switchable component also includes a light extraction layer extending between the glazing layer and one of the transitional layers that distributes light emitted from the light source.

Another aspect of the disclosed embodiments is a panel that includes first and second glazing layers; first and second transitional layers extending between the first and second glazing layers that guide light emitted from a light source; a third glazing layer extending between the first and second transitional layers through which light emitted from the light source is guided; and a light extraction layer extending between the third glazing layer and one of the first and second transitional layers that distributes light emitted from the light source. The first and second transitional layers have refractive indices that gradually decrease from a first value at surfaces proximate to the first and second glazing layers to a second value at surfaces proximate to the third glazing layer.

DETAILED DESCRIPTION

Light-control panels for use in vehicle cabins or office buildings can be formed from laminated glass or other light-transmissive materials layered with various optical components. To provide in-glass lighting with improved performance in terms of reflections, optical components including transitional films or coatings, suspended-particle films or coatings, and a light source can be combined with glazing layers. The optical components can be included in a stack-up designed to optimize overall performance of the light-control panel while minimizing weight, cost, and susceptibility to interference from the external environment. The term optical component is used to identify various portions of the light-control panel providing specified optical properties. Each optical component may be of singular, uniform construction or may alternatively comprise multiple sub-parts, layers, or other features that work together to achieve the specified optical properties described for the given optical component.

Figure 1:
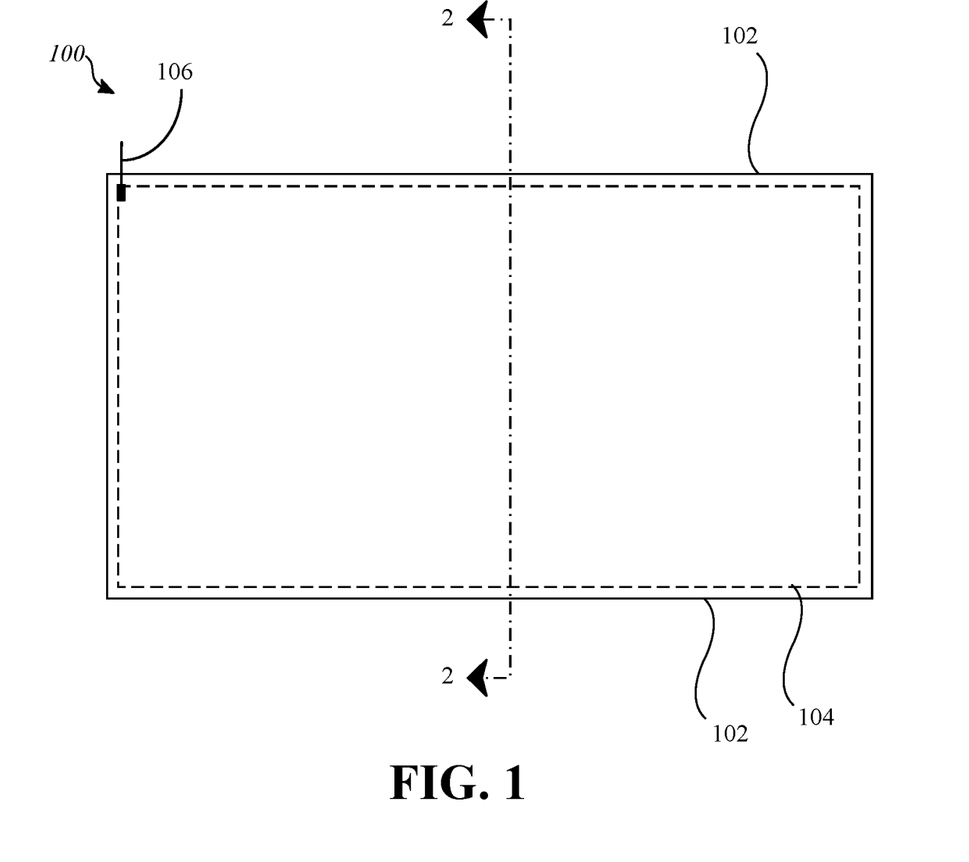
FIG. 1 is a plan view illustration showing a light-control panel.

FIG. 1 is a plan view illustration showing a laminated glazing or panel, designated generally as panel 100. The panel 100 may be used, for example, in a vehicle windshield, side window, sunroof, or backlight, or in another application, such as in building construction as an office window. The panel 100 can include various internal layers having optical properties, safety properties, and adhesive properties in various stack-ups further described below.

The panel 100 can have outer edges 102 and can include a switchable component 104 designated in dotted line to indicate its internal position within the panel 100. The term "switchable" is used to denote that a state change is possible for the component, such as between on and off states, between opaque and translucent states, or between bright and dim states, for example. Other state changes for the switchable component 104 are also possible. The switchable component 104 can extend near or adjacent to the outer edges 102 of the panel 100 without reaching the outer edges 102 as shown. The switchable component 104 can also extend fully to the outer edges 102 of the panel 100. The panel 100 can include an edge treatment (not shown) suitable for allowing the panel 100 to be held, for example, in a frame (not shown).

The panel 100 can include an electrical connection 106. The electrical connection 106 can be connected to a power source and/or to a controller to provide electrical power and/or control signals to the switchable component 104 that is incorporated in the panel 100. Electrical power and/or control signals passing through the electrical connection 106 to the switchable component 104 can be used to modify a degree of light transmission through the panel 100. For example, an amount of light transmitted through the panel 100 may be controllable by a voltage of a control signal delivered to the switchable component 104 by the electrical connection 106, producing, for example, an in-panel light source or a tint or darkening of the panel 100 as perceived by an occupant inside a vehicle or a pedestrian outside the vehicle in which the panel 100 is located. The electrical connection 106 may incorporate transparent electrodes, such as indium tin oxide (ITO) electrodes, to allow control of the variable light-transmissive properties of the switchable component 104 within the panel 100.

Figure 2:
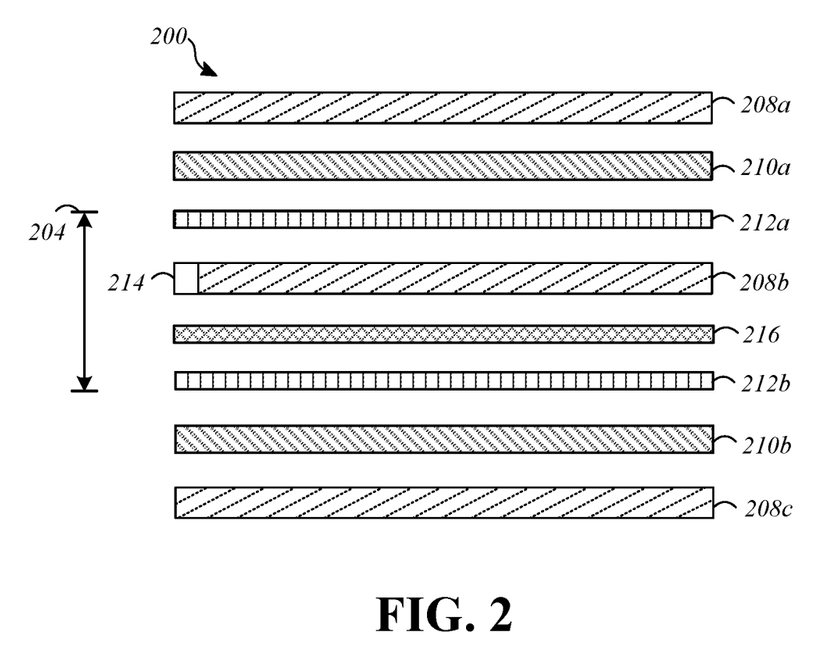
FIG. 2 is an exploded cross-sectional view of the panel of FIG. 1 taken along line 2-2 that shows a stack-up of layered optical components.

FIG. 2 is an exploded cross-sectional view of the panel 100 of FIG. 1 taken along line 2-2 of FIG. 1. For clarity, the cross-section in FIG. 2 will be described as panel 200. The panel 200 includes glazing layers 208a,b,c, (optional) lamination layers 210a,b, transitional layers 212a,b, a light source 214, and a light extraction layer 216. The transitional layers 212a,b, one of the glazing layers 208b, the light source 214, and the light extraction layer 216 form a switchable component 204 that provides an in-glass lighting or light-guide feature.

The switchable component 204 of the panel 200 requires protection from interference with optical performance. This protection can be provided by isolating surfaces that act as light guides (e.g., the transitional layers 212a,b) from the external environment. The panel 200 is formed by stacking, sandwiching, layering, or otherwise combining optical components one on top of the other, one next to the other, or one disposed within another both to join the optical components mechanically and to leverage the different optical performance of each of the optical components. When one layer or optical component is described as extending between others, its location within the stack-up is being described. The layers or optical components within the panel 200 may be co-extensive, or gaps or fillers may also be present to structurally form the panel 200 from its component parts.

The glazing layers 208a,b,c include an outer glazing layer 208a, a central glazing layer 208b, and an inner glazing layer 208c. The outer glazing layer 208a serves as an outer surface of the panel 200. The central glazing layer 208b forms a portion of the switchable component 204. The inner glazing layer 208c serves as an inner surface of the panel 200. The glazing layers 208a,b,c can be formed from glass, acrylic, or other soda-lime or polycarbonate material. Other glazing materials are also possible, with the glazing materials generally being solid in form as well as having light-transmissive material properties. The glazing layers 208a,b,c can also have strength and safety properties, such as anti-shatter or bulletproof-type construction.

The (optional) lamination layers 210a,b can be used to adhere the various optical components in the panel 200 together. The lamination layers 210a,b can be formed from polyvinyl butyral (PVB), thermoplastic polyurethane (TPU), ethylene vinyl acetate (EVA), or other optically-clear adhesives (OCA) having low color indices that allow for high transparency. Other lamination materials are also possible, with the lamination materials generally having light-transmissive, heat-softening, and adhesive-bonding material properties. The various optical components of the panel 200 can be laminated in the described stack-ups using heat, pressure, and adhesion of the various lamination layers 210a,b to the optical components according to a traditional lamination and curing process, for example, using vacuum bagging and autoclaving. Other lamination processes to adhere the optical components together are also possible.

Though two lamination layers 210a,b are shown as present between the glazing layers 208a,b,c and the transitional layers 212a,b of the panel 200, either a greater number or a lesser number of lamination layers may be used depending on adhesive or bonding properties of other optical components. For example, some optical components may extend directly along or adjacent to other optical components without the use of lamination layers should at least one of the co-extensive optical components have adhesive or bonding material properties. In the panel 200 of FIG. 2, the transitional layers 212a, b have properties that allow direct bonding to the central glazing layer 208b and the light extraction layer 216, respectively, and the light extraction layer 216 has properties that allow direct bonding to the central glazing layer 208b as well.

The transitional layers 212a,b serve as outer portions of the switchable component 204 and are located in the panel 200 in a location and position that ensures that a sharp or step-based change in refractive index (e.g., see the FIG. 3 refractive index change from n2 to n1) occurs at both the outer-facing and inner-facing surfaces of the central glazing layer 208b to guide light. In addition, the transitional layers 212a,b are designed with a gradual change in refractive index (e.g, see the FIG. 3 refractive index change from n1 to n2) such that light is guided with improved performance in terms of reflection when compared, for example, to using an air gap or a low-index PVB to guide light along the central glazing layer 208b.

The transitional layers 212a,b can be formed from an optically-clear, low-index material. For example, the transitional layers 212a,b can be low-reflection films, low index films, or ultra-low index films structured as plastic or polymer substrates that are layered or stacked between optically-clear adhesives in order to achieve the gradually changing refractive index across the thickness of each of the transitional layers 212a,b. The gradual change in refractive index across the transitional layers 212a,b allows for index matching between the glazing layers 208a,b,c and the transitional layers 212a,b, thus avoiding the introduction of reflections at interfaces between these components. The transitional layers 212a,b can be designed to have a thickness approximately 10 times the wavelength of the light being emitted by the light source 214 and guided by the transitional layers 212a,b for improved performance that avoids optical interference. A graphical representation of refractive index values within various layers of the panel 200 and the improvements garnered by use of the transitional layers 212a,b is further described in respect to FIG. 3.

The light source 214 and the light extraction layer 216 are used in combination with the central glazing layer 208b and the transitional layers 212a,b to form the switchable component 204 that provides an in-glass lighting function. Where the transitional layers 212a,b serve to guide light based on the sharp or step-based change in refractive index between edges of the transitional layers 212a,b (where refractive index equals n2) and the central glazing layer 208b (where refractive index equals n1), the light source 214 provides the light to be guided, for example, using light-emitting diodes (LEDs) that are located at an edge or an end of the central glazing layer 208b. Other forms for the light source 214 are also possible. The light extraction layer 216 can be a coating, a tin-oxide layer, or another film structured to scatter, extract, evenly distribute, and/or emit the guided, reflected light from surfaces of the central glazing layer 208b. Though the light extraction layer 216 is shown in the panel 200 of FIG. 2 as extending between the central glazing layer 208b and the inner glazing layer 208c, the light extraction layer 216 can alternatively extend between the central glazing layer 208b and the outer glazing layer 208a without impacting performance of the switchable component 204. In another example (not shown), the central glazing layer 208b can be absent, and the light extraction layer 216 can be formed from a particle-infused substrate with localized refractive index changes.

Figure 3:
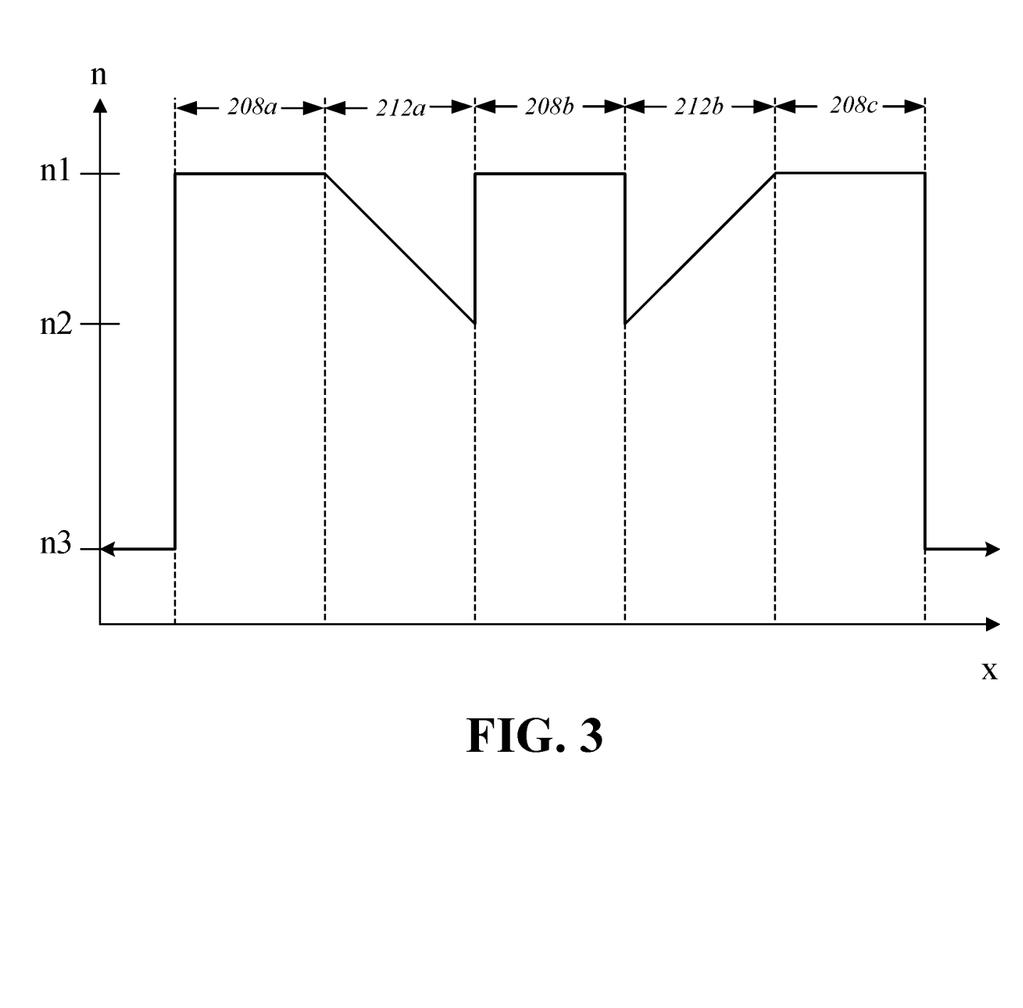
FIG. 3 is a graphical view of refractive index values for some of the layered optical components described in FIG. 2.

FIG. 3 is a graphical view of refractive index (n) values plotted against distance (x) through the panel 200. In this example, the distance (x) extends from a location outside the panel 200 on the left to a location inside the panel 200 on the right of the graph. The refractive indices represented include those for materials that form the external environment (e.g. air, unlabeled), the glazing layers 208a,b,c, and the transitional layers 212a,b described in FIG. 2. The lamination layers 210a,b and the light extraction layer 216 of the panel 200 are not included in the graph of FIG. 3 for simplicity.

The first value of refractive index indicated on the graph of FIG. 3, n1, is the highest of the refractive index values indicated and aligns with or occurs at edges or surfaces of the glazing layers 208a,b,c. In one example, the glazing layers 208a,b,c can be formed from glass having a refractive index value n1 of approximately 1.5. Other values for n1 are also possible, for example, values ranging between 1.40 and 1.70 depending on the materials that form the glazing layers 208a,b,c. The refractive index value n1 also aligns with or occurs at edges or surfaces of the transitional layers 212a,b that extend along edges or surfaces of the inner and outer glazing layers 208a, c. That is, both the edges or surfaces of the glazing layers 208a,b,c and one side, edge, or surface of each of the transitional layers 212a,b have refractive index values of n1. In the example shown in FIG. 3, it is the edges or surfaces of the transitional layers 212a,b furthest from the central glazing layer 208b that have refractive index values of n1.

The second value of refractive index indicated on the graph of FIG. 3, n2, is the central of the refractive index values indicated and aligns with or occurs at edges or surfaces of the transitional layers 212a,b that extend along edges or surfaces of the central glazing layer 208b. That is, the transitional layers 212a,b are designed to have a gradual change in refractive index between n1 and n2 that has several benefits. First, the transitional layers 212a,b have the refractive index value of n1 at the interface to the inner and outer glazing layers 208a,c that also have refractive index values of n1. This index matching avoids the introduction of optical reflections at this interface. Second, the transitional layers 212a,b have the refractive index value n2 at the interface to the central glazing layer 208b that has a refractive index value of n1. This refractive index step change or jump occurs in order for the transitional layers 212a,b to effectively guide light as part of the switchable component 204.

In one example, the transitional layers 212a,b can be formed such that the refractive index value n2 ranges between 1.00 and 1.70 with selection of the value of n2 depending on the value of n1 since n2 should be sufficiently lower or decreased in value as compared to n1 in order to preserve light guide properties of the transitional layers 212a,b. In the example shown in the graph of FIG. 3, the transitional layers 212a,b have refractive indices that decrease in a linear manner from an n1 equal to approximately 1.5 to an n2 equal to approximately 1.3. In another example using layers of alternative materials (not shown), n1 can equal approximately 1.65 and n2 can equal approximately 1.45. In another example (not shown), n1 can equal approximately 1.40 and n2 can equal approximately 1.15. The transitional layers 212a,b thus gradually decrease in refractive index from a value of n1 at the edges or surfaces that extend along the edges or surfaces of the inner and outer glazing layers 208a,c to a value of n2 at the edges or surfaces that extend along the edges or surfaces of the central glazing layer 208b. Though a linear decrease is shown, other gradual decreases (e.g., logarithmic, sinusoidal, etc.) are also possible The third value of refractive index indicated on the graph of FIG. 3, n3, is the lowest of the refractive index values indicated and aligns with or occurs in the medium in which the panel 200 is disposed. In the example of FIG. 3, the refractive index value n3 can indicate that the medium is air and have a value equal to approximately 1.0. In other examples, the refractive index value n3 can indicate that the medium is water with a value of the refractive index equal to approximately 1.3. Other values for the refractive index n3 are possible, with the specific value of n3 being dependent upon the type of medium that forms the external environment around the panel 200.

Use of the transitional layers 212a,b with gradually changing refractive indices (e.g., between n1 and n2) in a location positioned between the glazing layers 208a,b,c allows for a simply-constructed panel 200 without an air gap or exposed surface proximate the switchable component 204. Thus, performance of the switchable component 204 is unaffected by environmental interference or surface defects that may occur in respect to surfaces of the inner and outer glazing layers 208a,c.

Figure 4:
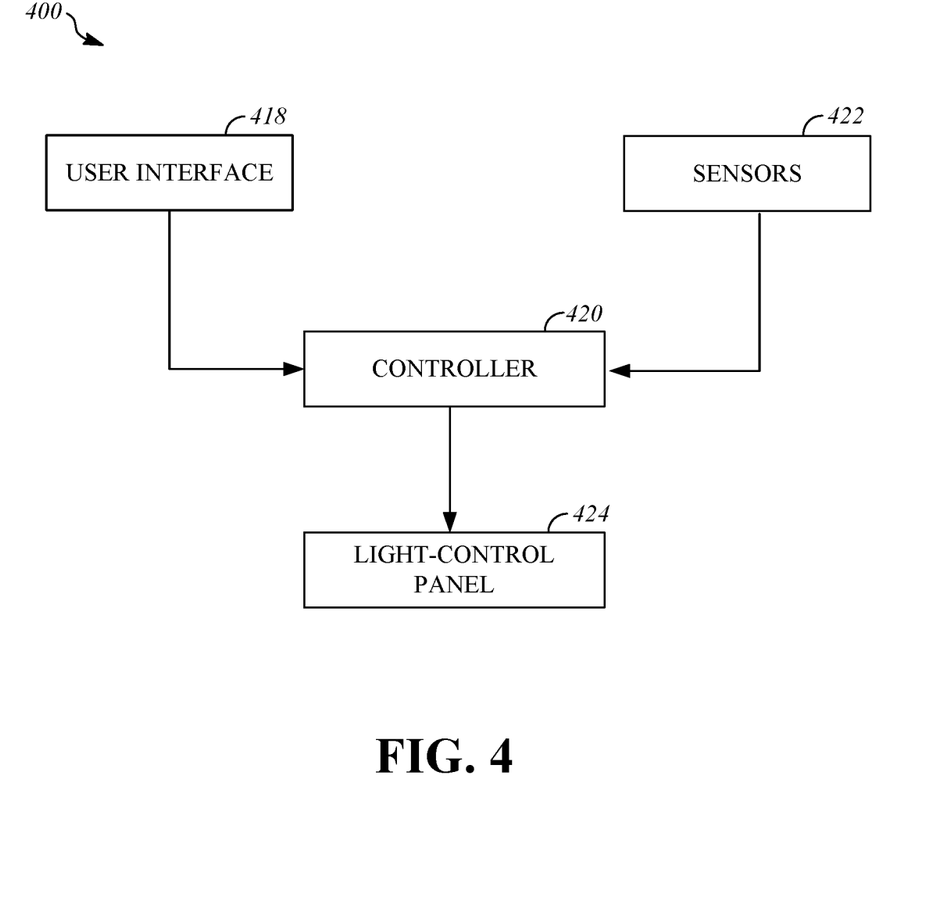
FIG. 4 is a block diagram that shows a panel control system.

FIG. 4 is a block diagram that shows a panel system 400. The panel system 400 can include a user interface 418, a controller 420, sensors 422, and a light-control panel 424 similar to the panels 100, 200 described in reference to FIGS. 1-2.

The user interface 418 allows a user to modify aspects of the operation of the panel system 400 and to set a desired state for the panel system 400, such as a state of illumination, privacy, or transparency associated with the light-control panel 424. That it, the user interface 418 can allow modification of operating parameters of the light-control panel 424, for example, based on user preferences.

The controller 420 coordinates operation of the panel system 400 by communicating electronically (e.g., using wired or wireless communications) with the user interface 418, the sensors 422, and the light-control panel 424. The controller 420 may receive information (e.g., signals and/or data) from the user interface 418, from the sensors 422, and/or from other portions (not shown) of the panel system 400.

The sensors 422 may capture or receive information related, for example, to an external environment where the panel system 400 is located. The external environment can be an exterior or an interior of a vehicle or an office, and information captured or received by the sensors 422 can relate to weather, such as a presence of rain or sunshine, or lighting conditions, such as a use of lighting by occupants within the vehicle or the office or an absence of sunlight exterior to a vehicle.

The panel system 400 can change an amount of light transmission by or through the light-control panel 424 based on a control signal, such as a signal from the controller 420. The control signal may cause the light-control panel 424 to modify a current light transmission characteristic, for example, from a first light transmission value to a second light transmission value that is different than the first light transmission value, or from a light transmitting state to a light blocking or reflecting (mirror) state. Technologies that may be used to implement the light-control panel 424 include switchable components such as light guide devices as well as other devices such as suspended particle devices, electrochromic devices, polymer dispersed liquid crystal devices, and guest host liquid crystal devices.

Figure 5:
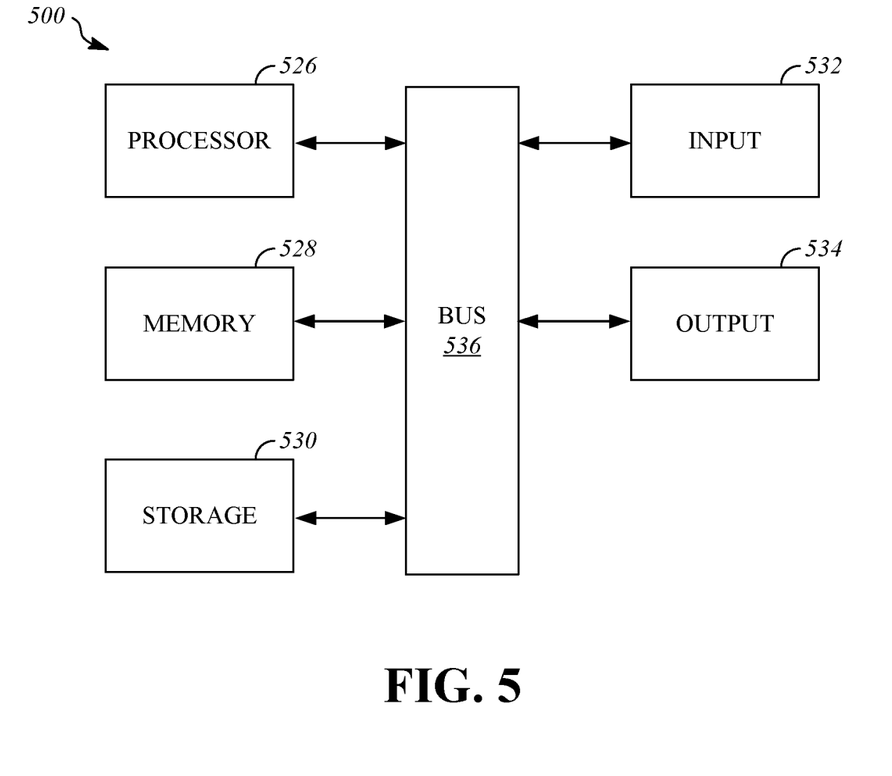
FIG. 5 is an illustration showing an example of a hardware configuration for a controller.

FIG. 5 shows an example of a hardware configuration for a controller 500 that may be used to implement the controller 420 and/or other portions of the panel system 400. In the illustrated example, the controller 500 includes a processor 526, a memory device 528, a storage device 530, one or more input devices 532, and one or more output devices 534. These components may be interconnected by hardware such as a bus 536 that allows communication between the components.

The processor 526 may be a conventional device such as a central processing unit and is operable to execute computer program instructions and perform operations described by the computer program instructions. The memory device 528 may be a volatile, high-speed, short-term information storage device such as a random-access memory module. The storage device 530 may be a non-volatile information storage device such as a hard drive or a solid-state drive. The input devices 532 may include sensors and/or any type of human-machine interface, such as buttons, switches, a keyboard, a mouse, a touchscreen input device, a gestural input device, or an audio input device. The output devices 534 may include any type of device operable to provide an indication to a user regarding an operating state, such as a display screen, a light-control panel, or an audio output.

As described above, one aspect of the present technology is the gathering and use of data available from various sources, such as from sensors 422 or user profiles, to improve the function of light-control panels such as the panels 100, 200. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to light-transmission through light-control panels to best match user lighting preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based light transmission through a light-control panel, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in light transmission through light-control panels can be implemented for a given user by inferring user preferences based on non-personal information data, a bare minimum amount of personal information, other non-personal information available to the device, or publicly available information.

What is claimed is:

1. A panel, comprising:
a light source;
transitional layers;
a glazing layer extending between the transitional layers, wherein the transitional layers guide light emitted from the light source through the glazing layer; and
a light extraction layer extending between the glazing layer and one of the transitional layers that distributes light emitted from the light source,
wherein the transitional layers have refractive indices that gradually decrease from a first value at surfaces that face away from the glazing layer to a second value at surfaces that face the glazing layer.

2. The panel of claim 1, wherein the transitional layers comprise plastic or polymer substrates layered between optically clear adhesives.

3. The panel of claim 1, wherein the first value is between 1.40 and 1.60 and the second value is between 1.25 and 1.45.

4. The panel of claim 3, wherein the first value is approximately 1.50 and the second value is approximately 1.30.

5. The panel of claim 1, wherein the first value is at least 0.2 more than the second value.

6. The panel of claim 1, wherein the light source comprises LEDs located at an edge of the glazing layer.

7. The panel of claim 1, wherein the light extraction layer comprises at least one of a coating, a particle-infused substrate, or a tin-oxide layer that extracts and distributes light from at least one surface of the glazing layer.

8. A switchable component, comprising:
a light source;
transitional layers that guide light emitted from the light source; and
a glazing layer extending between the transitional layers through which light emitted from the light source is guided,
wherein the transitional layers have refractive indices that decrease in a linear manner from a first value at surfaces opposing the glazing layer to a second value at surfaces facing the glazing layer.

9. The switchable component of claim 8, further comprising:
a light extraction layer extending between the glazing layer and one of the transitional layers that distributes light emitted from the light source.

10. The switchable component of claim 9, wherein the light extraction layer comprises at least one of a coating, a particle-infused substrate, or a tin-oxide layer that extracts and distributes light from at least one of the surfaces of the glazing layer.

11. The switchable component of claim 8, wherein the first value is between 1.40 and 1.60 and the second value is between 1.25 and 1.45.

12. The switchable component of claim 11, wherein the first value is approximately 1.50 and the second value is approximately 1.30.

13. The switchable component of claim 8, wherein the first value is at least 0.2 more than the second value.

14. The switchable component of claim 8, wherein the light source comprises LEDs located at an edge of the glazing layer.

15. A panel, comprising:
a light source disposed at an edge of a glazing layer;
transitional layers that sandwich the glazing layer and guide light emitted from the light source, wherein the transitional layers have refractive indices that decrease gradually from a first value at sides opposite the glazing layer to a second value lower than a refractive index of the glazing layer at sides adjacent to the glazing layer; and
a light extraction layer extending between the glazing layer and one of the transitional layers that distributes light emitted from the light source.

16. The panel of claim 15, wherein the transitional layers comprise plastic or polymer substrates layered between optically-clear adhesives.

17. The panel of claim 15, wherein the first value is at least 0.2 more than the second value.

18. The panel of claim 15, wherein the gradual decrease in refractive index between the first value and the second value is linear.

19. The panel of claim 15, wherein the first value is between 1.40 and 1.60 and the second value is between 1.25 and 1.45.

20. The panel of claim 15, wherein the light extraction layer comprises at least one of a coating, a particle-infused substrate, or a tin-oxide layer that extracts and distributes light from at least one surface of the glazing layer.

* * * * *